(12) United States Patent
Przybyla et al.

(10) Patent No.: US 9,005,397 B2
(45) Date of Patent: *Apr. 14, 2015

(54) POLYMER DISPERSION

(75) Inventors: Christian Przybyla, Duisburg (DE);
Oliver Struck, Henfenfeld (DE); André Laschewsky, Potsdam (DE);
Bernd-Reiner Paulke, Potsdam (DE)

(73) Assignees: Akzo Nobel N.V., Arnhem (NL);
Fraunhofer-Gesellschaft zur Förderung der angewandten Forschung E.V., Munich (DE)

( * ) Notice: Subject to any disclaimer, the term of this patent is extended or adjusted under 35 U.S.C. 154(b) by 23 days.

This patent is subject to a terminal disclaimer.

(21) Appl. No.: 13/059,874

(22) PCT Filed: Aug. 19, 2009

(86) PCT No.: PCT/EP2009/060696
§ 371 (c)(1),
(2), (4) Date: Apr. 5, 2011

(87) PCT Pub. No.: WO2010/020650
PCT Pub. Date: Feb. 25, 2010

(65) Prior Publication Data
US 2011/0174453 A1    Jul. 21, 2011

Related U.S. Application Data

(60) Provisional application No. 61/090,938, filed on Aug. 22, 2008.

(30) Foreign Application Priority Data

Aug. 22, 2008 (EP) .................... 08162796

(51) Int. Cl.
| | | |
|---|---|---|
| *D21H 11/00* | (2006.01) | |
| *C08F 2/20* | (2006.01) | |
| *C08F 220/56* | (2006.01) | |
| *D21H 17/37* | (2006.01) | |
| *D21H 17/42* | (2006.01) | |
| *D21H 21/10* | (2006.01) | |
| *C08F 218/08* | (2006.01) | |
| *C08F 220/06* | (2006.01) | |
| *C08F 220/18* | (2006.01) | |
| *C08F 220/58* | (2006.01) | |

(52) U.S. Cl.
CPC .............. *C08F 2/20* (2013.01); *C08F 218/08* (2013.01); *C08F 220/06* (2013.01); *C08F 220/18* (2013.01); *C08F 220/56* (2013.01); *C08F 2220/585* (2013.01); *D21H 17/37* (2013.01); *D21H 17/42* (2013.01); *D21H 21/10* (2013.01)

(58) Field of Classification Search
USPC ............ 162/164.6, 168.3; 524/832, 814, 800, 524/804, 816, 817, 401, 460
See application file for complete search history.

(56) References Cited

U.S. PATENT DOCUMENTS

| | | | |
|---|---|---|---|
| 8,039,550 B2 * | 10/2011 | Przybyla et al. | ............... 524/832 |
| 2006/0281858 A1 | 12/2006 | Przybyla et al. | |
| 2012/0022203 A1 * | 1/2012 | Przybyla et al. | ............... 524/460 |

FOREIGN PATENT DOCUMENTS

| | | |
|---|---|---|
| CN | 1542031 | 11/2004 |
| JP | 2002-294593 | 10/2002 |
| WO | 01/18063 | 3/2001 |
| WO | 01/18064 | 3/2001 |
| WO | 2006/123993 | 11/2006 |

OTHER PUBLICATIONS

International Search Report and Written Opinion for PCT/EP2009/060696, dated Oct. 16, 2009, 13 pages.
Extended European Search Report for EP Application No. 08162796.0, dated Jan. 15, 2009, 6 pages.
Tan, J. S., "Characterization of Ionic Behavior of Polyelectrolytes", Polymer Preprints, Aug. 1, 1976, vol. 17, No. 2, pp. 300-305.
Chinese Office Action, CN Application No. 200980132549.3, Apr. 21, 2012, translation provided.
Japanese Office Action, JP Application No. 2011-523416, Mailed Jan. 2, 2013, translation provided.

* cited by examiner

*Primary Examiner* — Mark Halpern
(74) *Attorney, Agent, or Firm* — Kenyon & Kenyon LLP

(57) ABSTRACT

The invention relates to an aqueous polymer dispersion comprising an anionic water-soluble dispersion polymer comprising in polymerized form a monomer mixture comprising (i) one or more anionic monomers, (ii) a first non-ionic vinyl monomer which is acrylamide, and (iii) at least one second non-ionic vinyl monomer; a water-soluble salt and a stabilizer, wherein the water soluble salt is present in an amount of at least 2.0% by weight, based on the total weight of the dispersion. The invention further relates to a process for producing the aqueous polymer dispersion, use of the aqueous polymer dispersion as a flocculating agent in papermaking or for water purification, and a process for producing paper which comprises adding one or more drainage and retention aids comprising the aqueous polymer dispersion to an aqueous suspension containing cellulosic fibers and then dewatering the obtained suspension.

9 Claims, No Drawings

POLYMER DISPERSION

REFERENCE TO RELATED APPLICATION(s)

This application is the U.S. National Phase of PCT/EP2009/060696 filed on Aug. 19, 2009, and claims the benefit of U.S. Provisional Application No. 61/090,938 filed on Aug. 22, 2008.

FIELD OF THE INVENTION

The present invention relates to an aqueous polymer dispersion and its production and use, and a process for producing paper in which the dispersion is used as an additive.

BACKGROUND OF THE INVENTION

Aqueous dispersions of anionic polymers are widely used in industry, for examples as flocculating agents, in particular as drainage and retention aids in papermaking and for water purification. In general, such dispersions comprise a water-soluble anionic dispersion polymer dispersed in an aqueous continuous phase which may contain one or more water-soluble salts and one or more stabilizers. The dispersions are generally prepared by dispersion polymerization in which the monomers and initiator are soluble in the polymerization medium, but the aqueous medium containing large amounts of water-soluble salts is a poor solvent for the resulting polymer. The reaction mixture is homogeneous at the onset, and the polymerization is initiated in a homogeneous solution. Phase separation occurs at an early stage of the polymerization process and colloidal polymer particles are formed and stabilized by adsorption of stabilizer.

WO 2001/18063 discloses a method of increasing retention and drainage in papermaking using high molecular weight water-soluble anionic or non-ionic dispersion polymers. The dispersion polymer is prepared using from about 2 to about 40 weight percent based on the total weight of the dispersion of a water-soluble salt.

WO 2006/123993 discloses a process for preparing a polymer dispersion and a polymer dispersion obtained by the process which is suitable for use as a retention and drainage aid in papermaking. The polymer dispersion is prepared by using an anionic polymeric stabilizer and an anionic polymeric co-stabilizer of relatively low molecular weight. The use of the polymeric stabilizer and co-stabilizer enables the use of from 0 to about 1.9 weight percent of inorganic salt. Preferably, the dispersion is substantially salt-free.

In general, aqueous dispersions of anionic polymer are easily producible and effective as retention and drainage aids in papermaking. However, there is still room for improvements. For instance, when preparing dispersion polymers in the presence of water-soluble salts, it has been experienced that high amounts of water-soluble salts are usually required to obtain effective and stable formation of polymer particles, which is undesired from an economic and environmental viewpoint. It has also been observed that the viscosity of the reaction medium and the obtained dispersion may be too high, which is undesired from a production and handling viewpoint. It has also been observed that dispersions of high content dispersion polymer are usually difficult to obtain, which is undesired from a transportation cost viewpoint. In addition, in respect of polymer dispersions containing more than one anionic stabilizer and, in particular, low molecular weight anionic co-stabilizers, it is known that low molecular weight anionic materials increase the cationic demand of cellulosic suspensions in papermaking and it has been experienced that low molecular weight anionic materials may interfere with and adversely effect the performance of cationic additives used in the papermaking process.

It would be advantageous to be able to provide an aqueous anionic polymer dispersion and process for its production which require a lower amount of water-soluble salt to achieve effective and stable polymer particle formation. It would also be advantageous to be able to provide an aqueous anionic polymer dispersion and process for its production which exhibit low viscosity and the avoidance of, or lower, viscosity peaks during the polymerization process. It would also be advantageous to be able to provide an aqueous anionic polymer dispersion and process for its production which enable higher dispersion polymer contents. It would also be advantageous to be able to provide an aqueous anionic polymer dispersion and process for its production which can be conducted without the use of low molecular weight anionic co-stabilizers. It would also be advantageous to be able to provide a papermaking process which comprises the use of aqueous anionic polymer dispersion exhibiting improved drainage and retention performance.

SUMMARY OF THE INVENTION

The present invention relates to an aqueous polymer dispersion comprising an anionic water-soluble dispersion polymer comprising in polymerized form a monomer mixture comprising
  (i) one or more anionic monomers,
  (ii) a first non-ionic vinyl monomer which is acrylamide, and
  (iii) at least one second non-ionic vinyl monomer;
a water-soluble salt and stabilizer, wherein the water soluble salt is present in an amount of at least 2.0% by weight, based on the total weight of the dispersion.

The present invention further relates to a process for producing an aqueous polymer dispersion comprising an anionic water-soluble dispersion polymer, which comprises polymerizing a monomer mixture comprising
  (i) one or more anionic monomers,
  (ii) a first non-ionic monomer which is acrylamide, and
  (iii) at least one second non-ionic vinyl monomer;
under free radical forming conditions in an aqueous solution of a water-soluble salt in the presence of a stabilizer, wherein the water soluble salt is present in an amount of at least 2.0% by weight, based on the weight of the dispersion.

The present invention also relates to the use of an aqueous polymer dispersion comprising an anionic water-soluble dispersion polymer as a flocculating agent, in particular as a drainage and retention aid in papermaking and as a flocculating agent for water purification.

The invention is further generally directed to a process for producing paper which comprises
  (i) providing an aqueous suspension containing cellulosic fibres;
  (ii) adding to the suspension one or more drainage and retention aids comprising an aqueous polymer dispersion according to the invention; and
  (iii) dewatering the obtained suspension.

DETAILED DESCRIPTION OF THE INVENTION

In accordance with the present invention there is provided an aqueous dispersion of anionic water-soluble polymer, also referred to herein as anionic dispersion polymer, which is suitable for use as a flocculating agent in papermaking and water purification, in particular as a drainage and retention aid in papermaking.

"Dispersion polymer", as used herein, means a water-soluble polymer dispersed in an aqueous continuous phase containing one or more inorganic salts and one or more stabilizers. The water-soluble polymer is preferably dispersed in an aqueous phase in the form of colloidal particles stabilized by adsorption of stabilizer. "Anionic dispersion polymer", as used herein, means a dispersion polymer as defined herein which possesses a net negative charge.

"Drainage and retention aids", as used herein, refers to one or more additives which, when added to an aqueous cellulosic suspension, give better drainage and/or retention than what is obtained when not adding the said one or more additives.

The present invention provides low-viscous, stable aqueous polymer dispersions having higher dispersion polymer contents and lower salt contents. Compared to prior art processes, the present process exhibits improved viscosity characteristics and requires less salt for stabilized precipitation of polymer particles. Hereby the present invention leads to a simplified and improved production process and economic benefits. Furthermore, the anionic dispersion polymer of the invention exhibit improved drainage performance over prior art anionic dispersion polymers when used in papermaking. Hereby the present invention makes it possible to increase the speed of the paper machine and to use a lower dosage of additive to give a corresponding drainage and retention effect, thereby leading to an improved paper making process and economic benefits.

The anionic dispersion polymer according to the invention comprises in polymerized form one or more anionic monomers, a first non-ionic vinyl monomer which is acrylamide, and one or more further non-ionic vinyl monomers, herein referred to as a second non-ionic vinyl monomer not being acrylamide. The anionic monomer, as defined herein, possesses a net negative charge. Examples of suitable anionic monomers include acrylic acid, methacrylic acid, 2-acrylamido-2-methyl-1-propanesulfonic acid, acrylamidomethyl-butanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and the water-soluble alkali metal, alkaline earth metal, and ammonium salts thereof. Examples of preferred anionic monomers include acrylic acid and methacrylic acid.

The first and second non-ionic monomers, as defined herein, are electrically neutral and contain one or more vinyl groups, or ethylenically unsaturated bonds. Examples of suitable second non-ionic vinyl monomers include those forming homopolymers which, when having a weight average molecular weight of above 10,000, are characterized by a water-solubility of less than 1 g/l, measured at 70° C. in deionized water, suitably less than 0.1 g/l, measured at 70° C. in deionized water, or less than than 0.1 g/l, measured at 20° C. in deionized water. Examples of suitable second non-ionic vinyl monomers include N-isopropyl(meth)acrylamide, N-t-butyl acrylamide, methyl (meth)acrylate, ethyl methacrylate, n-butyl(meth)acrylate, s-butyl (meth)acrylate, t-butyl (meth)acrylate, benzyl (meth)acrylate, poly(ethylene glycol) monoalkylether mono(meth)acryate, 2-alkoxyethyl (meth)acrylate, 2-hydroxyethyl (meth)acrylate, vinyl methylsulfone, vinyl methylketone, (meth)acrolein, vinyl ethylether, vinyl isobutylether, vinyl propionate and vinyl acetate. Examples of preferred second non-ionic vinyl monomers include methyl acrylate, methyl methacrylate, ethyl methacrylate, and vinyl acetate.

The monomer mixture, and the resulting anionic dispersion polymer, usually comprise anionic monomer in an amount of from about 1 to about 40 mole %, suitably from about 10 to about 30 mole % or from about 15 to about 25 mole %; usually comprises acrylamide in an amount of from about 20 to about 98 mole %, suitably from about 40 to about 80 mole % or from about 50 to about 70 mole %; and usually comprises second non-ionic vinyl monomer in an amount of from about 1 to about 40 mole %, suitably from about 10 to about 30 mole % or from about 15 to about 25 mole %, the percentages being based on the total amount of monomers.

The anionic dispersion polymer usually has a weight average molecular weight from about 1,000,000 to about 15,000,000 g/mole, suitably from about 1,500,000 to about 10,000,000 g/mole, or from about 2,000,000 to about 8,000,000 g/mole.

The particles of anionic dispersion polymer present in the dispersion usually have an average particle diameter of less than 25 μm, usually in the range of from about 0.5 to about 20 μm, suitably from about 0.8 to about 15 μm.

The aqueous polymer dispersion usually comprises the anionic dispersion polymer in an amount of from about 5 to about 40% by weight, suitably from about 10 to about 30% by weight or from about 12 to about 25% by weight, based on the total weight of the dispersion.

The aqueous polymer dispersion of the invention further comprises a stabilizer for the anionic dispersion polymer particles present in the dispersion. The stabilizer is suitably a polymer, preferably an anionic polymer. Preferably, the stabilizer polymer is water-soluble and soluble or slightly soluble in the salt solution used in the polymerization process of the invention. Examples of suitable stabilizer polymers include anionic polymers and copolymers based on acrylic acid, methacrylic acid and 2-acrylamido-2-methyl-1-propanesulfonic acid, e.g. polyacrylic acid, poly(meth)acrylic acid, poly(2-acrylamido-2-methyl-1-propanesulfonic acid) and copolymers of 2-acrylamido-2-methyl-1-propanesulfonic acid and acrylic acid or methacrylic acid. Examples of suitable anionic stabilizer polymers include those disclosed in WO 2001/18063, the disclosure of which is hereby incorporated herein by reference.

The stabilizer polymer usually has a weight average molecular weight from about 5.000 to about 2,000,000 g/mole, suitably from about 20,000 to about 1,000,000 g/mole, or from about 50,000 to about 500,000 g/mole.

The remainder of the aqueous polymer dispersion consists of an aqueous solution comprising one or more water-soluble salts. Preferably, the water-soluble salt is inorganic. Examples of suitable water-soluble salts include ammonium, alkali metal and alkaline earth metal salts of mono-, di- and trivalent anions, e.g. halides, sulphates, nitrates and phosphates, preferably salts of di- and trivalent anions. Examples of preferred water-soluble salts include ammonium sulphate, sodium sulphate and mixtures thereof.

The aqueous polymer dispersion comprises water-soluble salt in an amount of at least 2% by weight, usually from about 3 to about 40% by weight, suitably from about 6 to about 32% by weight or from about 10 to about 25% by weight, based on the total weight of the dispersion.

Additional ingredients may be present in the aqueous polymer dispersions of the invention. Examples of such additional ingredients include chelating agents, chain transfer agents, nucleating agents, cross-linking agents, branching agents, co-dispersants or co-stabilizers. Such additional ingredients may be present in the aqueous polymer dispersion in amounts commonly used in the art. Examples of suitable co-stabilizers include polymeric co-stabilizers, e.g. anionic polymers. Preferably, when an anionic polymer stabilizer is used, the anionic polymer co-stabilizer differs from the anionic polymer stabilizer, e.g. by being prepared from different monomers or in different monomer ratios.

In one embodiment of the invention, a polymeric co-stabilizer is present in the aqueous polymer dispersion in an amount of from 0 to 1% by weight, based on the total weight of the dispersion. In another embodiment of the invention, no polymeric co-stabilizer is present in the aqueous polymer dispersion.

The aqueous polymer dispersion is suitably produced by a free-radical polymerisation process initiated by a free-radical forming polymerization initiator, suitably a water-soluble azo, peroxide, hydroperoxide, perester or redox initiator. Examples of suitable initiators include 2,2'-azobis(2-amidinopropane) dihydrochloride, 2,2'-azobis[2-(2-imidazolin-2-yl)propane] dihydrochloride, 2,2'-azobis-(2-methyl-N-(2-hydroxyethyl)-propionamide, 2,2'-azobis(isobutyronitrile), 2,2'-azobis(2,4-dimethylvaleronitrile), 4,4'-azobis-(4-cyanovaleric acid) and its alkali and ammonium salts, t-butylhydroperoxide, perhydrol, peroxydisulphate, or the before mentioned peroxides in combination with a reducing agent such as sodium metabisulphite or ferrous salts.

The monomers may be mixed together with water, salt and stabilizer prior to polymerization or, alternatively, one or more monomers may be added stepwise during the polymerization in order to obtain proper incorporation of the monomers into the resultant dispersion polymer. In the process, the polymerization temperature may vary depending on, inter alia, the monomers and initiator used. The polymerization is usually conducted at a temperature of from about 30 to about 90° C., suitably from about 35 to about 70° C. or from about 45 to about 65° C. The reaction mixture is suitably stirred during the polymerisation process at a stirring rate suitable for the process. Suitably, the stirring rate is from about 100 to about 1000 rpm. Additional ingredients, including those and amounts defined above, can of course be present in the aqueous solution used in the process of producing the anionic polymer dispersion.

The invention further comprises use of the aqueous polymer dispersion as a flocculating agent, in particular as a drainage and retention aid in papermaking and as a flocculating agent for water purification, e.g. wastewater treatment, as a dry strength agent in papermaking, thickening agent and soil improvement agent.

The invention further comprises a process for producing paper from an aqueous suspension containing cellulosic fibres, and optional fillers, which comprises adding to the suspension one or more drainage and retention aids comprising the aqueous polymer dispersion, and forming and draining (dewatering) the obtained suspension on a wire. The one or more drainage and retention aids may also comprise one or more cationic polymers, siliceous materials, aluminium compounds and combinations thereof.

Examples of suitable cationic polymers include cationic polysaccharides, e.g. cationic starches, cationic synthetic polymers, e.g. cationic polyacrylamides, cationic poly(diallyldimethylammonium chlorides), cationic polyethylene imines, cationic polyamines and cationic polyamidoamines. The weight average molecular weight of the cationic polymer is usually above about 1,000,000 g/mole and suitably above about 2,000,000 g/mole. The upper limit is not critical; it can be about 50,000,000 g/mole, usually 30,000,000 g/mole.

Examples of suitable siliceous materials include anionic silica-based particles and anionic clays of the smectite type. Preferably, the siliceous material has particles in the colloidal range of particle size. Anionic silica-based particles, i.e. particles based on $SiO_2$ or silicic acid, are preferably used and such particles are usually supplied in the form of aqueous colloidal dispersions, so-called sols. Examples of suitable silica-based particles include colloidal silica and different types of polysilicic acid, either homopolymerised or co-polymerised, for example polymeric silicic acid, polysilicic acid microgel, polysilicate and polysilicate microgel. The silica-based sols can be modified and contain other elements, e.g. aluminum, boron, magnesium, nitrogen, zirconium, gallium, titanium and the like, which can be present in the aqueous phase and/or in the silica-based particles.

Examples of suitable drainage and retention aids for use in conjunction with the aqueous polymer dispersion include cationic starches, cationic polyacrylamides, anionic siliceous materials, aluminium compounds and combinations thereof. Examples of preferred combinations of drainage and retention aids include (i) cationic starch and the present aqueous polymer dispersion, (ii) cationic polyacrylamide and the present aqueous polymer dispersion, and (iii) cationic polyacrylamide, silica-based particles and the present aqueous polymer dispersion.

The one or more drainage and retention aids can be added to the suspension to be dewatered in amounts which can vary within wide limits depending on, inter alia, type and number of additives, type of cellulosic suspension, filler content, type of filler, point of addition, etc. The anionic dispersion polymer is usually added in an amount of at least 0.001%, often at least 0.005% by weight, based on dry weight of the cellulosic suspension, and the upper limit is usually 3% and suitably 1.5% by weight. The aqueous polymer dispersion of the invention is suitably diluted with water before adding it to the cellulosic suspension. When used, the cationic polymer is usually added in an amount of at least about 0.001% by weight, often at least about 0.005% by weight, based on dry weight of the cellulosic suspension, and the upper limit is usually about 3% and suitably about 1.5% by weight. When used, the siliceous materials are usually added in an amount of at least about 0.001% by weight, often at least about 0.005% by weight, based on dry weight of the cellulosic suspension, and the upper limit is usually about 1.0% and suitably about 0.6% by weight.

Further additives which are conventional in papermaking can of course be used in combination with the aqueous polymer dispersion according to the invention. Examples of such further additives include dry strength agents, wet strength agents, optical brightening agents, dyes, sizing agents, e.g. rosin-based sizing agents and cellulose-reactive sizing agents, e.g. alkyl and alkenyl ketene dimers and multimers, and alkenyl succinic anhydrides, etc.

The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate. The term "paper", as used herein, include not only paper and the production thereof, but also other cellulosic fibre-containing sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspension can be based on fibres from chemical pulp such as sulphate, sulphite and organosolv pulps, mechanical pulp such as thermomechanical pulp, chemo-thermomechanical pulp, refiner pulp and groundwood pulp, from both hardwood and softwood, and can also be based on recycled fibres, optionally from de-inked pulps, and mixtures thereof.

The invention is further illustrated in the following examples which, however, are not intended to limit the same.

Parts and % relate to parts by weight and % by weight, respectively, unless otherwise stated.

EXAMPLE 1

This example shows the preparation of aqueous polymer dispersions according to the technical teachings of the prior art and according to the present invention.

The polymer dispersions were prepared according to the following general procedure:

To a 150 ml ml HWS double-walled glass reactor equipped with reflux condenser, nitrogen inlet and anchor stirrer was added 53 g of deionised water, 0.04 g of sodium formiate, 0.03 g of EDTA, x g of sodium sulphate, y g of ammonium sulphate, 1.2 g of an 80/20 mole/mole acrylic acid/2-acrylamido-2-methyl-1-propane sulphonic acid copolymer and anionic monomer (partly (25% or 50%) or fully (100%) neutralized by 50 wt. % sodium hydroxide). 50 wt. % aqueous solution of acrylamide and, optionally, a second non-ionic monomer were added from a dropping funnel.

After closing the reactor, nitrogen was purged through the mixture over 30 min at a stirring rate of 150/min and the mixture was then heated to 55° C. Polymerization was initiated by stepwise addition of 0.5 g (500 μl) of 2 wt. % aqueous solution of polymerization initiator VA-044. The stepwise additions of VA-044 solution were conducted as follows: 30 μl at 0 h, 30 μl after 1 h, 30 μl after 2 h, 120 μl after 4 h, and finally 290 μl after 5 h. After 6 h, the reaction mixture was cooled down and analyzed.

The polymer dispersions obtained are shown in Table 1, which also shows the degree of neutralization of the anionic monomer (N=25%), (N=50%) or (N=100%). Aqueous Polymer Dispersion Nos. 1 to 7 represent prior art polymer dispersions and Aqueous Polymer Dispersion Nos. 8 to 10 represent polymer dispersions according to the invention.

TABLE 1

| Aqueous Polymer Disp. No. | Polymer Content [%] | Monomer/[mole %] | | | $Na_2SO_4$/ $(NH_4)_2SO_4$ [g/g] | Appearance and Flow Properties |
|---|---|---|---|---|---|---|
| | | Anionic | AAM | $2^{nd}$ Non-ionic | | |
| 1 | 10 | MAA/30 (N = 100%) | 70 | — | 15.25/10.16 | Ok |
| 2 | 10 | MAA/20 (N = 50%) | 80 | — | 12.6/8.4 | Very viscous, stirrer covered |
| 3 | 10 | AA/20 (N = 50%) | 80 | — | 13.86/9.24 | Highly viscous |
| 4 | 12 | MAA/20 (N = 50%) | 80 | — | 12.6/8.4 | Very viscous, stirrer covered |
| 5 | 12 | MAA/20 (N = 25%) | 80 | — | 13.86/9.24 | Ok |
| 6 | 15 | MAA/20 (N = 50%) | 80 | — | 13.86/9.24 | Inhomogeneous, rubber-like |
| 7 | 15 | AA/20 (N = 50%) | 80 | — | 13.86/9.24 | Inhomogeneous, rubber-like |
| 8 | 12 | MAA/20 (N = 100%) | 60 | EMA/20 | 13.86/9.24 | Ok |
| 9 | 12 | MAA/20 (N = 100%) | 60 | MMA/20 | 13.86/9.24 | Ok |
| 10 | 15 | MAA/10 (N = 50%) | 70 | VAC/20 | 12.6/8.4 | Ok | wherein
AAM = acrylamide
MAA = methacrylic acid
AA = acrylic acid
EMA = ethyl methylacrylate
MMA = methyl methacrylate
VAC = vinyl acetate
N = percentage of charged (neutralized) form present
ok = white, homogeneous, low-viscous flow As is evident from Table 1, at the same degree of neutralization of the anionic monomer, significantly more salt (sodium and ammonium sulphates) was needed for stabilized precipitation of the polymer products according to the prior art compared to the polymer products according to the invention. It is further evident that, without a second non-ionic monomer as used according to the present invention, the salt concentrations of the prior art dispersions were not sufficient for stabilized precipitation of the polymer products. It is further shown in Table 1 that the present invention provides polymer dispersions with higher polymer contents and lower salt contents.

EXAMPLE 2

Drainage performance of anionic polymer dispersions according to Example 1 was evaluated by means of a Dynamic Drainage Analyser (DDA), available from Akribi AB, Sweden, which measures the time for draining a set volume of stock. The stock was stirred in a baffled jar at a speed of 1500 rpm throughout the test while additions of chemicals were made. A stock volume of 800 ml was drained through a wire when removing a plug and applying vacuum to that side of the wire opposite to the side on which the stock is present. Drainage performance is reported as the dewatering time (s).

The cellulosic suspension, or stock, used consisted of 50% cellulosic fibers (60% bleached birch and 40% of bleached pine sulfate) and 50% of a pre-dispersed slurry of ground calcium carbonate, Hydrocarb 60. To increase the conductivity of the stock, $CaCl_2$ was added. Stock pH was 7.4, conductivity 5.0 mS/cm and consistency of 5.9 g/l.

In the tests, the anionic polymer dispersions were tested in conjunction with a cationic starch (PB930). The additions are calculated as dry additive on dry furnish. The additions were made according to the following general sequence:
(i) adding cationic starch followed by stirring for 20 seconds;
(ii) adding anionic dispersion polymer followed by stirring for 10 seconds; and
(iii) draining the stock while automatically recording the drainage time.

Table 2 shows the results at varying dosages of anionic dispersion polymer.

TABLE 2

| Test No. | Cationic Starch [kg/t] | Anionic Disp. Polymer [kg/t] | Drainage time [s] | | |
|---|---|---|---|---|---|
| | | | Polymer Disp. No. 5 | Polymer Disp. No. 8 | Polymer Disp. No. 9 |
| 1 | 4 | 2 | 26.4 | 22.5 | 22.0 |
| 2 | 4 | 3 | 27.8 | 22.8 | 23.4 |
| 3 | 4 | 4 | 29.7 | 23.8 | 24.4 |

As is evident from Table 2, the aqueous polymer dispersions according to the invention (Aqueous Polymer Dispersion Nos. 8 and 9) resulted in improved drainage compared to the prior art aqueous polymer dispersion (Aqueous Polymer Dispersion No. 5).

The invention claimed is:

1. An aqueous polymer dispersion comprising an anionic water-soluble dispersion polymer comprising in polymerized form a monomer mixture comprising
(i) one or more anionic monomers,
(ii) a first non-ionic vinyl monomer which is acrylamide, and
(iii) at least one second non-ionic vinyl monomer;
a water-soluble salt and a stabilizer, wherein the water soluble salt is present in an amount from about 3 to about 40% by weight, based on the total weight of the dispersion, and wherein the monomer mixture comprises from about 1 to about 40 mole % of anionic monomer, from about 20 to about 98 mole % of acrylamide, and from about 15 to about 40 mole % of second non-ionic vinyl monomer, the percentages being based on the total amount of monomers and the sum of percentages being 100.

2. The aqueous polymer dispersion according to claim 1, wherein the anionic monomer is acrylic acid or methacrylic acid.

3. The aqueous polymer dispersion according to claim 1, wherein the second non-ionic vinyl monomer is selected from the group consisting of methyl methacrylate, ethyl methylacrylate, vinyl acetate and mixtures thereof.

4. The aqueous polymer dispersion according to claim 1, wherein the anionic water-soluble dispersion polymer is present in an amount of from about 5 to about 40% by weight, based on the total weight of the dispersion.

5. The aqueous polymer dispersion according to claim 1, wherein the stabilizer is an anionic polymer or copolymer based on acrylic acid, methacrylic acid or 2-acrylamido-2-methyl-1-propanesulfonic acid.

6. The aqueous polymer dispersion according to claim 1, wherein the stabilizer has a weight average molecular weight from about 5,000 to about 2,000,000 g/mole.

7. The aqueous polymer dispersion according to claim 1, wherein the water-soluble salt is selected from ammonium, alkali metal and alkaline earth metal salts of mono-, di- and trivalent anions.

8. The aqueous polymer dispersion according to claim 1, wherein the water-soluble salt comprises ammonium sulphate, sodium sulphate or a mixture thereof.

9. An aqueous polymer dispersion comprising an anionic water-soluble dispersion polymer comprising in polymerized form a monomer mixture comprising
(i) one or more anionic monomers;
(ii) a first non-ionic vinyl monomer which is acrylamide; and
(iii) at least one second non-ionic vinyl monomer,
a water-soluble salt and a stabilizer, wherein the water soluble salt is present in an amount of from about 3 to about 40% by weight, based on the total weight of the dispersion, and wherein the monomer mixture comprises from about 1 to about 40 mole % of anionic monomer, from about 20 to about 98 mole % of acrylamide, and from about 15 to about 25 mole % of second non-ionic vinyl monomer, the percentages being based on the total amount of monomers and the sum of percentages being 100.

* * * * *